United States Patent [19]

Korall et al.

[11] Patent Number: 5,445,901
[45] Date of Patent: * Aug. 29, 1995

[54] ZINC-OXYGEN BATTERY

[75] Inventors: Menachem Korall; Yehuda Harats; Boris Dechovich; Jonathan Goldstein, all of Jerusalem, Israel

[73] Assignee: Electric Fuel (E.F.L.) Ltd., Jerusalem, Israel

[*] Notice: The portion of the term of this patent subsequent to Nov. 22, 2011 has been disclaimed.

[21] Appl. No.: 286,539

[22] Filed: Aug. 5, 1994

Related U.S. Application Data

[63] Continuation-in-part of Ser. No. 213,674, Mar. 15, 1994, Pat. No. 5,366,822.

[51] Int. Cl.⁶ ............................................ H01M 12/06
[52] U.S. Cl. ............................ 429/27; 429/26; 429/72; 429/118
[58] Field of Search ................ 429/27, 26, 34, 62, 429/72, 149, 110, 113, 118, 120

[56] References Cited

U.S. PATENT DOCUMENTS

| | | | |
|---|---|---|---|
| 4,620,111 | 10/1986 | McArthur et al. | 429/27 X |
| 4,640,874 | 2/1987 | Kelm | 429/27 |
| 5,242,763 | 9/1993 | Konishi et al. | 429/27 |
| 5,366,822 | 11/1994 | Korall et al. | 429/27 |

*Primary Examiner*—Anthony Skapars
*Attorney, Agent, or Firm*—Helfgott & Karas

[57] ABSTRACT

The invention provides a multi-cell, sealed, zinc-oxygen battery, comprising a container containing (a) a plurality of bi-cells, each cell having a housing provided with two major surfaces and accommodating a pair of oppositely-disposed, spaced-apart, air-permeable, liquid-impermeable cathodes in the form of oxygen-reduction electrodes, and defining between themselves a cavity configured to accommodate an anode of the battery and electrolyte, substantial portions of the major surfaces of the housing being removed, thus exposing major portions of the oxygen electrodes, and wherein the two major surfaces are partly recessed in such a way as to form, in conjunction with a similarly-recessed outer surface of a major wall of an adjacent cell housing, an inter-cathode gas space between adjacent cells with a plurality of oxygen access openings leading thereto; (b) a dead space volume between inner surfaces of the housing and the plurality of bi-cells; and (c) pressurized oxygen supply means for feeding oxygen to the dead space volume, for consumption in the inter-cathode gas spaces.

11 Claims, 3 Drawing Sheets

ZINC-OXYGEN BATTERY

The present specification is a continuation-in-part of U.S. patent application Ser. No. 08/213,674, filed Mar. 15, 1994, now U.S. Pat. No. 5,366,822.

The present invention relates to a zinc-oxygen battery. More particularly, the present invention relates to a multi-cell, sealed, zinc-oxygen battery, especially for use in electrically-powered sea craft such as torpedoes, surface ship and submarines. Other use modes may include vehicular and stationary applications, and in spacecraft.

U.S. Ser. No. 08/213,674 relates to a modular cell for a multi-cell metal-air battery system, and more particularly to such a system to be used in electrically-powered vehicles.

While the performance of the cell according to the above application (as well as of the gas diffusion electrode disclosed in U.S. Pat. No. 5,312,701, the teachings of which are incorporated herein by reference) proved to be superior to the prior art batteries with respect to the most important parameters of batteries for electric vehicles, namely, high continuous current drain as well as short-term high peak power output and high energy content, these cells were not quite satisfactory concerning certain practical aspects of their suitability for the above purpose.

Another use for the technology developed for electrically-powered vehicles is in electrically-powered sea craft. There are problems which are inherent in said intended use, as described, e.g., in U.S. Pat. No. 4,341,847.

Zinc-oxygen cells have been used in batteries for electric vehicles and the like because they provide high energy density relative to other cell chemistries, and therefore high capacity. Zinc-oxygen cells may be recharged by mechanically replacing the zinc electrode, by replacing the liquid electrolyte which contains zinc particles, or by electrochemically replenishing zinc to the anode, while also making available a fresh oxygen supply.

Many zinc-oxygen cells have a solid planar zinc anode and an oxygen cathode, separated by a liquid electrolyte. Other zinc-oxygen cells have anode active zinc particles dispersed in the electrolyte and an inert anode current collector. When an external electrical load is connected to the electrodes, current flows through the circuit of the cell and load due to chemical reactions which take place at the electrode surfaces.

Prior zinc-oxygen cells have not been as stable as desired, due in part to the zinc anode surface becoming uneven in operation, in both the discharge and the electrochemical charge modes. Further, zincate ions formed in the electrolyte may decrease the electrocatalytic activity of the electrocatalytically active gas-electrolyte-electrode reaction sites. It is important to retain as many as possible electrocatalytically active gas-electrolyte-catalyst reactions sites readily available to each of the three phases of reaction participants.

U.S. Pat. No. 4,009,320 teaches an air-zinc battery having air passages through an active carbon cathode which is surrounded by a gelled electrolyte. U.S. Pat. No. 4,137,371 describes a zinc-oxygen cell having a zinc electrode, and an oxygen porous diffusion cathode with a zincate ion diffusion restricting membrane joined directly to the oxygen electrode between the porous layer of this electrode and the zinc electrode. This is stated to prevent poisoning of the electrochemically-active material by zincate ions. Flowing electrolytes containing anode active metal, such as zinc, in zinc-oxygen cells, are described in U.S. Pat. No. 4,136,232. Problems of such cells connected in series are pointed out in that patent.

In U.S. Pat. No. 4,341,847 there is suggested an electrochemical zinc-oxygen cell having concentric electrodes and a flowing electrolyte in the annular space therebetween, providing slurry and electrochemical recharging in the same cell; however, such an arrangement is simply not practical in the limited spaces provided for such batteries, e.g., in torpedoes.

It is therefore desirable to modify a stack of modular cells of the type described in U.S. Pat. No. 5,366,822 for such uses.

Thus, according to the present invention there is now provided a multi-cell, sealed, zinc-oxygen battery comprising a container containing (a) a plurality of bi-cells, each cell having a housing provided with two major surfaces and accommodating a pair of oppositely-disposed, spaced-apart, air-permeable, liquid-impermeable cathodes in the form of oxygen-reduction electrodes, and defining between themselves a cavity configured to accommodate an anode of said battery and electrolyte, substantial portions of the major surfaces of said housing being removed, thus exposing major portions of said oxygen electrodes, and wherein said two major surfaces are partly recessed in such a way as to form, in conjunction with a similarly-recessed outer surface of a major wall of an adjacent cell housing, an inter-cathode gas space between adjacent cells with a plurality of oxygen access openings leading thereto; (b) a dead space volume between inner surfaces of said housing and said plurality of bi-cells; and (c) pressurized oxygen supply means for feeding oxygen to said dead space volume, for consumption in said inter-cathode gas spaces.

Said oxygen is preferably supplied from a pressurized cylinder, from a liquid oxygen tank, from a chlorate chemical candle, or from any other suitable per se known source.

In preferred embodiments of the present invention, the exposed portions of said oxygen electrodes are supported and reinforced by ribbing consituted at least by a plurality of slender rails, which rails define ducts for guiding a flow of oxygen across said portions of said oxygen electrodes.

In a further aspect of the present invention, it has now been found that because oxygen is used instead of air, and the cells are utilized in a closed container, problems inherent therein must also be solved.

Thus, for example, since the oxygen is supplied to the container and does not exhaust therefrom, therefore it can extract moisture from the electrolyte into the gas phase. There will be buildup of water vapor in the system, and this vapor can condense at colder zones into water droplets. Free liquid in the intercathode space may block reactive surfaces or short between electrodes exhibiting different potentials.

In order to overcome this problem, and with the drawbacks of the prior art systems in mind, in preferred embodiments of the present invention said space between adjacent cells is subdivided by plastic partitions. Thus, the above-mentioned problem is now overcome in these embodiments by introducing thin plastic partitions (0.01–0.1 mm) between adjacent cathodes. Hydrophobic partition materials or surfacings such as polysulfone, silicones or fluoropolymers help to enhance run-off of the droplets away from the intercathode space into the dead space volume around the stack; therefore, use of partitions wherein at least the surfaces thereof are hydrophobic is especially preferred.

In yet a further preferred embodiment of the present invention, said dead space volume contains at least one solid, fluid-absorbent material positioned therein at one or more locations. Such material can be comprised of one or more solid absorbents that can trap fluids, such as the 3M ® Brand universal absorbents, made of melt-blown polypropylene microfibers, which are described as picking up an average of ten times their weight in fluids. Such absorbents are marketed in pillow form, which pillows can be replaced, rinsed, dried and reused in multiple battery runs.

It should be noted that these elements (partition, solid absorbent) are not so critical in conventional zinc-air batteries, or in reserve batteries with conventional cathodes. Thus, in zinc-air batteries, the water vapor is swept out from the intercathode space and out of the battery together with the existing depleted air, and intercathode partitions would introduce an additional pressure drop that would greatly increase required blower size and parasitic power. Similarly, in reserve cells with conventional cathodes, there is no gaseous cathode active material to trap water vapor, and shunt currents from common hydraulic paths between cell electrolytes can be minimized more easily than in zinc-air cells.

In contradistinction, since we are supplying oxygen (and not air with its blanketing nitrogen), there is no need to flow the reactant gas in excess by means of a blower or gas pump over the cathodes. The oxygen is supplied stoichiometrically from the oxygen stored under pressure, and is consumed according to the ampere hours of zinc reacting during discharge, leaving no residual nitrogen, and does not have to flow by the cathode surfaces. In contrast, oxygen fills the deadspace in the container surrounding the stack, and the oxygen is sucked into the individual intercathode spaces during reaction.

For a single use, the whole battery is expendable after discharge and there are no means for mechanical recharging. For multiple use, the container may be opened and the stack accessed for spent zinc and fluid removal, optional rinsing and drying, replacement with new dry (or otherwise) zinc anodes and resealing, as well as replacement of the external electrolyte and oxygen stores.

The main advantages of zinc-oxygen over rival battery systems such as silver-zinc, aluminum-silver oxide and magnesium-silver chloride is the higher energy density and lower cost (no silver) achievable with zinc-oxygen.

In preferred embodiments of the present invention, said battery is a deferred-action battery and said container further comprises an electrolyte-storage vessel and an openable liquid flow path leading from said vessel to said cavity for activation of said battery; said pressurized oxygen supply means includes a cylinder of pressurized or liquid oxygen and supply valve; and said anode comprises a skeletal frame including conductive metal and having a portion of its surface area formed as open spaces, further comprising a rigid static bed of zinc particles compacted under pressure to said skeletal frame.

Thus, in an especially preferred embodiment, the invention provides a reserve, deferred-action, zinc-oxygen battery in which a stack of cells, each cell comprising a bicell with a central pressed zinc anode flanked by two oxygen reduction cathodes, is mounted in a sealed container. For longest shelf life (8–10 years), the pressed zinc anodes are in the dry state, either porous zinc alone or porous zinc with dry KOH, pressed onto a current collector, with the container under vacuum or filled with an inert gas, e.g., nitrogen, and containing optional getters for moisture, hydrogen or oxygen traces. When the battery is activated, electrolyte selected from one or more of water, KOH solution, sea water, is rapidly forced from a first auxiliary container into the interelectrode spaces within the bicells by means of a pump, hydraulic device, gas generator, or explosive squib device, etc., and simultaneously or subsequently, oxygen gas is supplied to the intercathode spaces between the bicells from a second auxiliary container of pressurized or liquid oxygen.

Deferred-action batteries have been known for decades and various embodiments of such batteries and methods for the production and use thereof, as well as for the manufacture of component parts therefor, have been described, e.g., in U.S. Pat. Nos. 2,491,640; 2,636,060; 2,655,551; 2,658,935; 2,716,671; 2,817,697; 3,343,988; 3,859,136; 3,953,238; 4,016,339; 4,192,913; 4,261,853; 4,332,864; 4,368,167; 4,487,821; 4,803,135 and 4,822,698; however, none of said patents teaches or suggests a deferred-action battery as described and defined herein.

The bicells may be rectangular, as described in U.S. patent application Ser. No. 08/213,674, the relevant teachings of which are incorporated herein by reference, can be circular, or can be in the form of a segment of an annular structure. In said latter configuration, said container is in the form of a cylindrical body having an annular internal space defined by outer and inner cylindrical walls and sealed at both ends, i.e., it can be in the form of a double-walled, sealed cylindrical body having a throughgoing bore to allow central cooling, e.g., by allowing cooling water to flow therethrough.

Alternatively, in additional preferred embodiments, cell cooling is achieved by providing a cooling fluid flow path within the zinc anode. This cooling fluid flow path may take the form of a coil, pipes, or a chamber within the anode.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
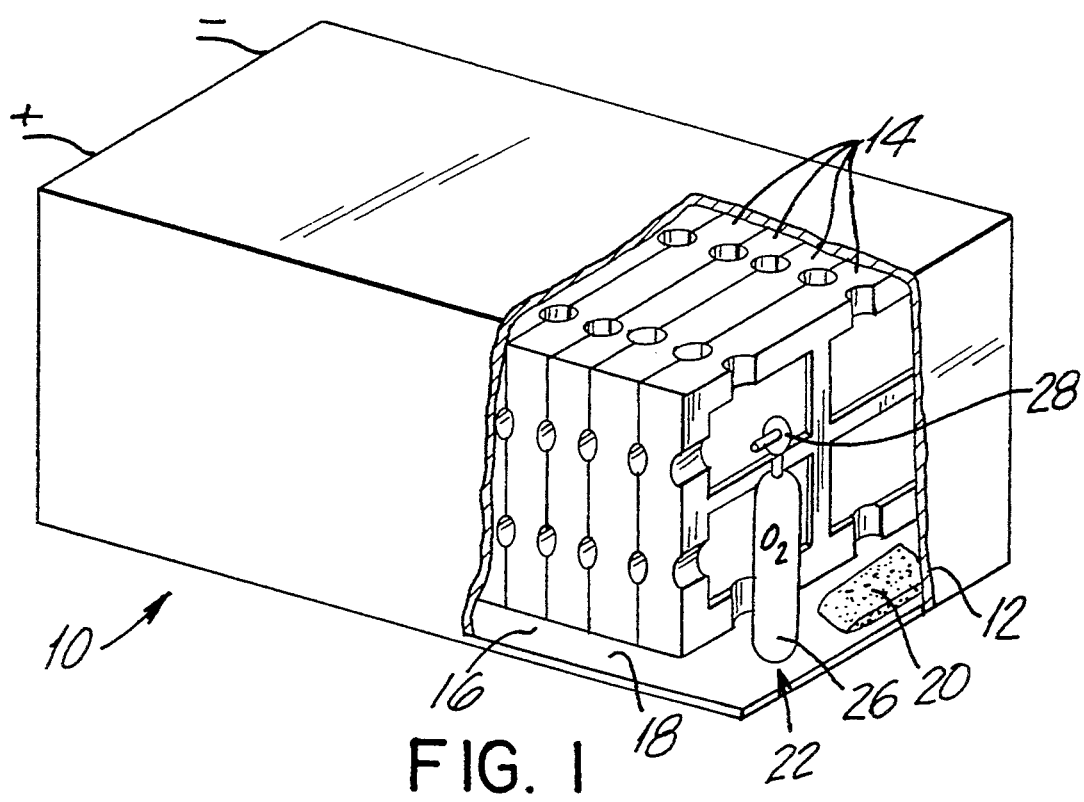
FIG. 1 is a perspective, fragmented view of a preferred embodiment of the battery according to the invention.

There is seen in FIG. 1 a multi-cell, sealed, zinc-oxygen battery 10 having an outer container 12 which holds a plurality of bi-cells 14. The bi-cells 14 will be described below with reference to FIG. 2.

Container 12 also includes a dead space volume 16 between the inner surfaces 18 of the housing and the plurality of cells 14. Advantageously, volume 16 contains at least one solid fluid-absorbent material 20, for example, activated carbon, silica gel, activated alumina, or Fuller's earth. Especially preferred is the 3M® Brand universal absorbent, made of melt-blown polypropylene microfibers, which can hold up to ten times its own weight of water. During operation of the battery 10, unwanted water vapor or droplets is generated and material 20 absorbs such vapor or droplets.

Figure 2:
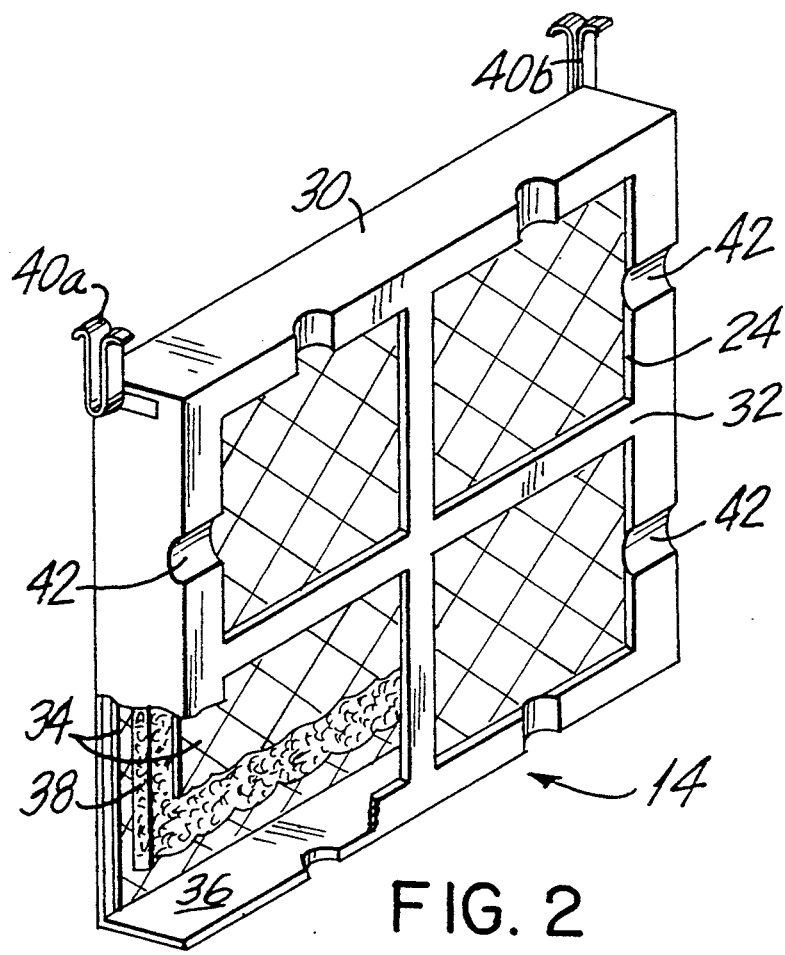
FIG. 2 is a perspective, fragmented view of a first embodiment of one of the bi-cells contained in the battery of FIG. 1.

Also provided in container 12 is a pressurized oxygen supply means 22 for feeding oxygen to the dead space volume 16, for consumption in inter-cathode gas spaces 24, seen in FIG. 2, which are formed between the bi-cells 14. Said oxygen is used for electrochemical operation of said bi-cell.

In the preferred embodiment shown, the pressurized oxygen supply means 22 includes a pressurized oxygen cylinder 26 and a supply valve 28. By means of valve 28, it is possible to control the oxygen pressure to the desired level. Furthermore, it is optionally possible, where suitable valve control means (not shown) are provided, to release oxygen into the bi-cells 14 only shortly before the battery 10 is required to produce electric power.

Referring now to FIG. 2, a bi-cell 14 is shown in further detail. A housing 30 having two major surfaces 32 accommodates a pair of oppositely-disposed, spaced-apart, air-permeable, liquid-impermeable cathodes 34, in the form of oxygen-reduction electrodes.

The cathodes 34 define between them a cavity 36, configured to accommodate an anode 38 and an electrolyte (not-shown) such as an aqueous KOH solution.

Substantial portions of the major surfaces 32 are removed, thus exposing major portions of the oxygen-reducing cathodes 34. Thereby the oxygen supplied to bi-cell 14 is able to reach and react with the cathodes 34.

The two major surfaces 32 are partly recessed in such a way as to form, in conjunction with a similarly-recessed outer surface of a major wall of an adjacent cell housing (not shown), an inter-cathode gas space 24 between adjacent bi-cells 14. A plurality of oxygen access openings 42 leads to the gas space 24. Cell terminals 40a, 40b allow power collection.

Figure 3:
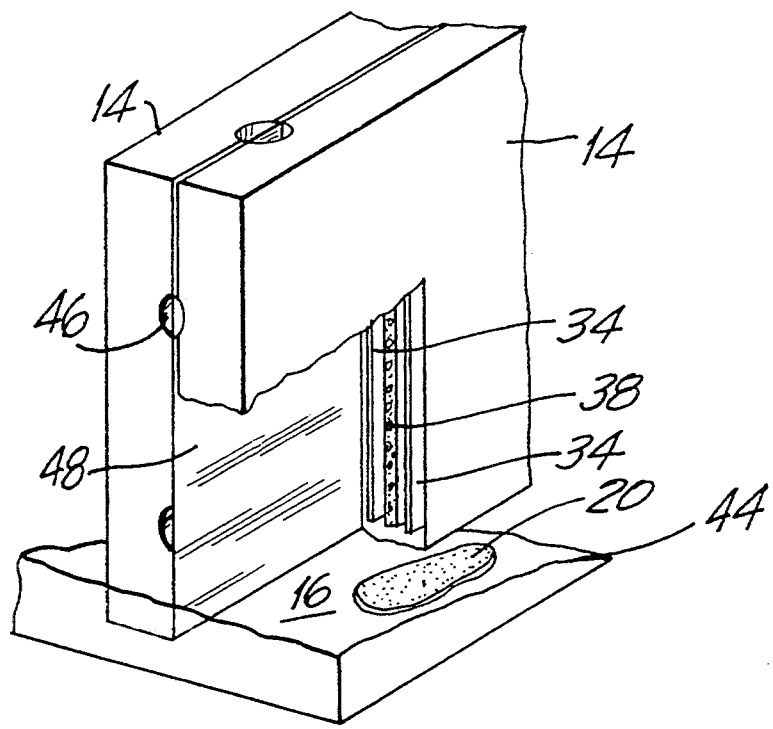
FIG. 3 is a perspective, fragmented view of part of a battery provided with plastic cell partitions.

FIG. 3 illustrates a detail of a multi-cell, sealed, zinc-oxygen battery 44, similar to battery 10 except that in this embodiment the gas space 46 between adjacent bi-cells 14 is subdivided by a plastic partition 48. The partition 48 is only 0.01 to 0.1 mm thick, which is sufficient to enhance run-off of any formed water droplets away from the inter-cathode gas space 46 and into the dead space volume 16, where an absorbent material 20 will safely capture the unwanted water.

Advantageously, at least the surfaces of partition 48 are hydrophobic, either being made from, or coated with, a material such as polysulfone, silicone, or a fluoropolymer.

Figure 4:
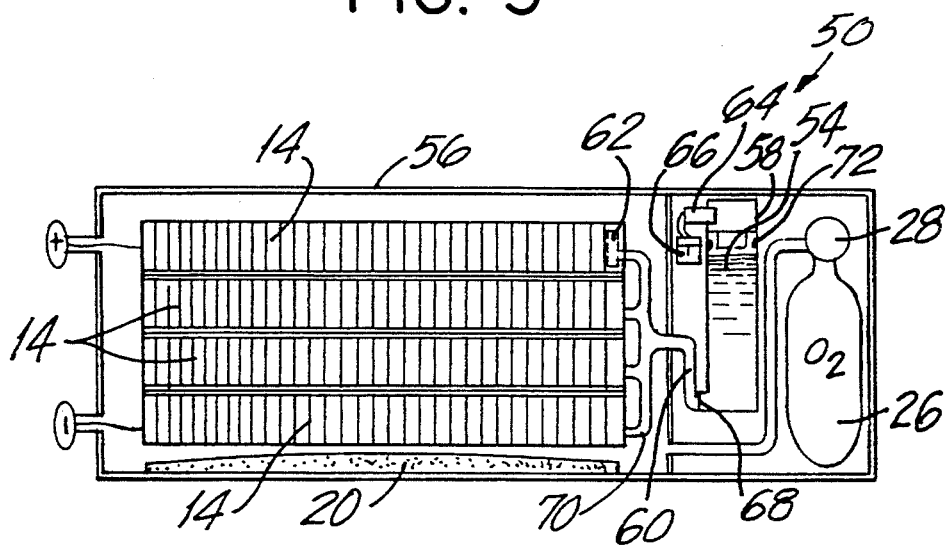
FIG. 4 is a diagrammatic view of a deferred-action battery.

Seen in FIG. 4 is a deferred-action battery 50. Both electrodes of the bi-cell 14 are free from contact with electrolyte 54 during storage. The pressed zinc anodes are dry. KOH, if present in the cells, is also in dry form. For an exceptionally long shelf life of up to 10 years, the battery container 56 is either filled with an inert gas or evacuated.

Battery 50 is also a multi-cell, sealed, zinc-oxygen battery, and is generally similar to battery 10. However, battery container 56 further contains an electrolyte storage vessel 58 and an openable liquid flow path 60, leading from vessel 58 to a cavity 62 inside each bi-cell 14 for activation.

In the embodiment shown, a gas-generation cartridge 64 is in fluid communication with vessel 58 and is electrically fireable by a timer 66 (shown) or by a remote-control device (not shown). When fired, the resultant high pressure inside vessel 58 causes electrolyte 54 to burst a rupture diaphragm 68 positioned in the flow path 60. Further expansion of the generated gas drives the electrolyte 54 along the flow path 60, through manifold 70 and into each of the multiple cell cavities 62. With the approximately simultaneous release of pressurized oxygen, battery 52 proceeds to generate electric power within a few seconds of its actuation, irrespective of battery orientation.

In this embodiment, a floating piston 72 separates the gas generated by cartridge 64 from the electrolyte 54, and prevents said gas from either entering the electrolyte 54 or from leaving the vessel 58.

Figure 5:
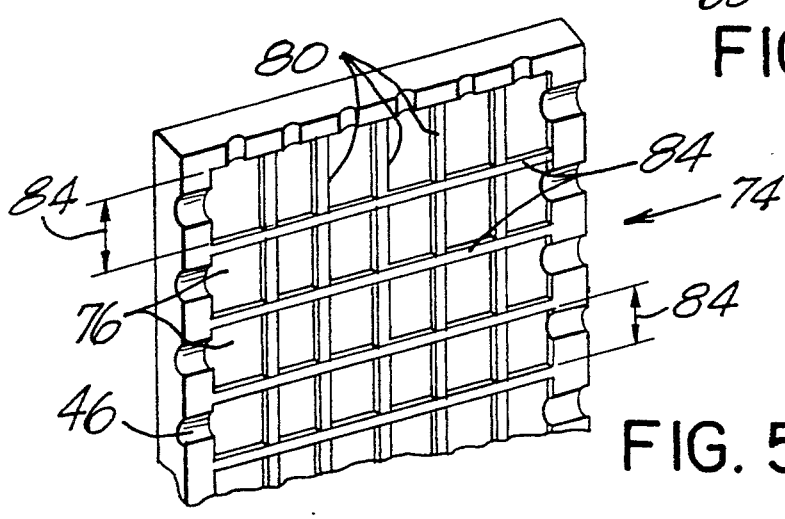
FIG. 5 is a perspective view of a further preferred embodiment of one of the bi-cells provided with oxygen ducts.

Referring now to FIG. 5, there is seen a preferred embodiment of a bi-cell 74 which has been removed from a multi-cell, sealed, zinc-oxygen battery 10, such as that described above with reference to FIG. 1.

Exposed portions 76 of oxygen-reduction electrodes 78 are supported and reinforced by ribbing 80. Said ribbing is constituted by a plurality of slender rails 82, which rails define ducts 84 for guiding a flow of oxygen across the portions 76 of the oxygen-reduction electrodes 78. Ducts 84 facilitate even distribution of oxygen, in particular to those parts of electrode 78 which are farthest from the point of oxygen entry.

Figure 6:
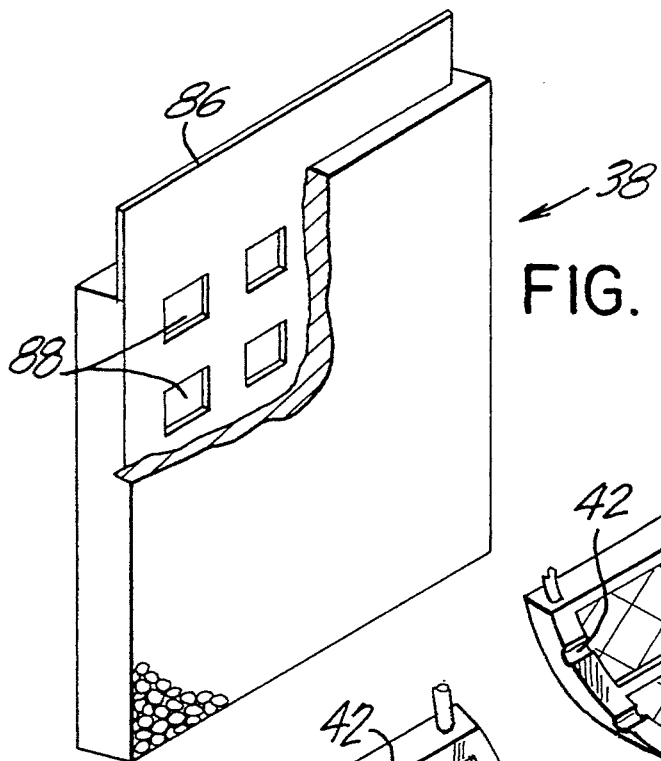
FIG. 6 is a perspective, fragmented view of a preferred embodiment of an anode, as used in the bi-cell described with reference to FIG. 2.

FIG. 6 depicts a preferred embodiment of an anode 38, used in the bi-cell 14 illustrated in FIG. 2. The anode 38 comprises a skeletal frame 86 including conductive metal, for example, copper. Frame 86 has a portion of its surface area formed as open spaces 88. Anode 38 further comprises a rigid static bed 90 of zinc particles, compacted under pressure to the skeletal frame 86. Bed 90, while mechanically stable and electrically connected to the frame 86 which is used for current take-off, nevertheless remains sufficiently porous to allow contact with electrolyte over a large surface area.

Figure 7A:
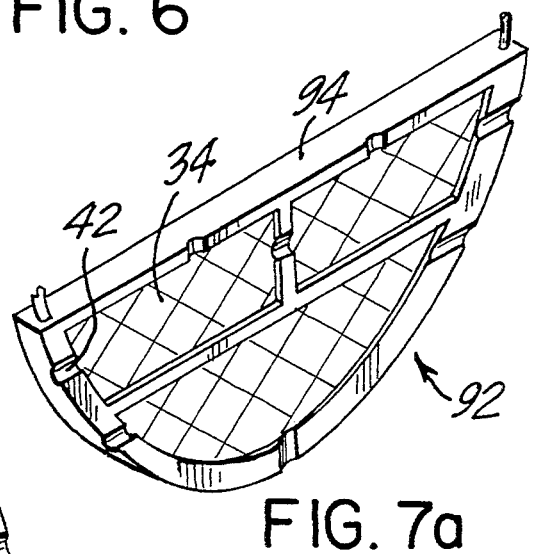
FIG. 7a is a perspective view of a bi-cell in the form of a cylinder segment.

Seen in FIG. 7a is a bi-cell 92, adapted for use in a multi-cell, sealed, zinc-oxygen battery of the type intended for use in a cylindrical outer container, for example, for supplying propulsive power to a torpedo. The cell housing 94 is in the form of a slice of cylinder segment, and when stacked with other cells, it will form a prism so shaped.

Figure 7B:
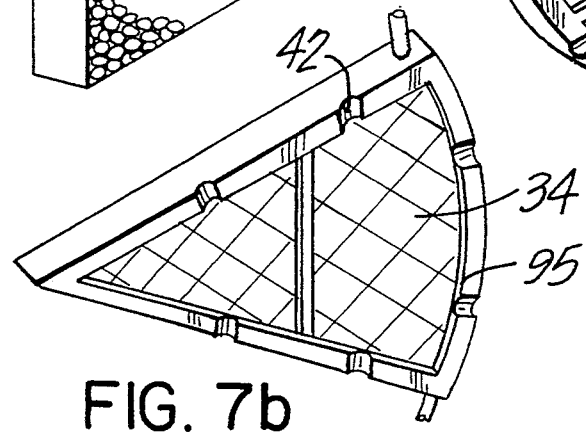
FIG. 7b is a perspective view of a bi-cell in the form of a cylinder sector.

FIG. 7b shows a bi-cell 95 shaped as a cylinder sector.

Selection of the bi-cell shape is made in accordance with the amount of space available in the craft to be powered.

Figure 8:
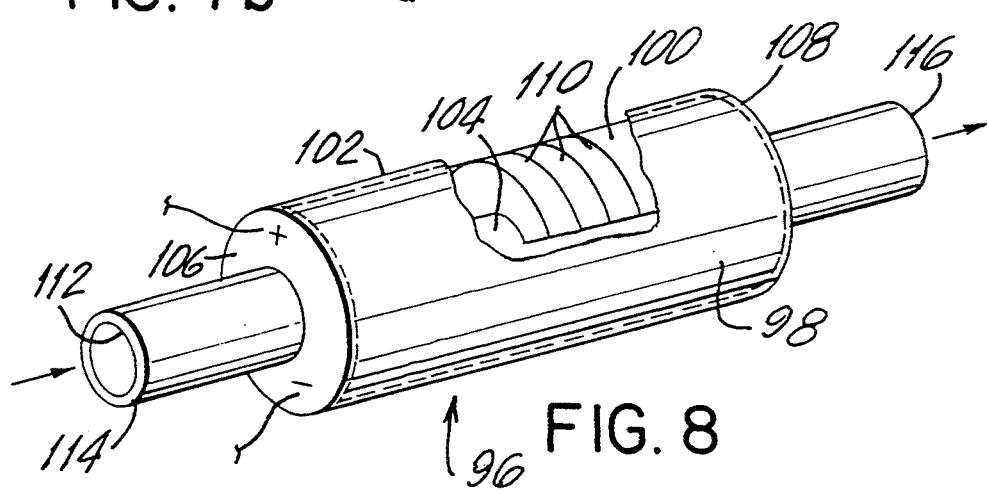
FIG. 8 is a perspective, fragmented view of a multi-cell sealed zinc-oxygen battery, wherein the battery is in the form of a cylindrical body.

Referring now to FIG. 8, there is shown a multi-cell, sealed, zinc-oxygen battery 96, wherein the battery container 98 is in the form of a cylindrical body having an annular space 100 defined by outer cylindrical wall 102 and inner cylindrical wall 104, sealed at both ends 106, 108.

Battery 96 contains a plurality of cell housings 110, which are in the form of a cylinder segment.

In the embodiment shown, battery 96 is provided with cooling means. The battery container 98 includes an inner cylindrical wall 104 surrounding a bore 112 having an inlet 114 and an outlet 116 for the passage therethrough of a cooling fluid. When the battery is intended to power sea craft, a convenient cooling fluid is sea water.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multi-cell, sealed, zinc-oxygen battery, comprising a container containing:
   (a) a plurality of bi-cells, each cell having a housing provided with two major surfaces and accommodating a pair of oppositely-disposed, spaced-apart, air-permeable, liquid-impermeable cathodes in the form of oxygen-reduction electrodes, and defining between themselves a cavity configured to accommodate an anode of said battery and electrolyte, substantial portions of the major surfaces of said housing being removed, thus exposing major portions of said oxygen electrodes, and wherein said two major surfaces are partly recessed in such a way as to form, in conjunction with a similarly-recessed outer surface of a major wall of an adjacent cell housing, an inter-cathode gas space between adjacent cells with a plurality of oxygen access openings leading thereto;
   (b) a dead space volume between inner surfaces of said housing and said plurality of bi-cells; and
   (c) pressurized oxygen supply means for feeding oxygen to said dead space volume, for consumption in said inter-cathode gas spaces.

2. A multi-cell, sealed, zinc-oxygen battery according to claim 1, wherein said space between adjacent cells is subdivided by plastic partitions.

3. A multi-cell, sealed, zinc-oxygen battery according to claim 2, wherein at least the surfaces of said partitions are hydrophobic.

4. A multi-cell, sealed, zinc-oxygen battery according to claim 1, wherein said dead space volume contains at least one solid, fluid-absorbent material.

5. A multi-cell, sealed, zinc-oxygen battery according to claim 1, wherein said battery is a deferred-action battery and said container further comprises an electrolyte-storage vessel and an openable liquid flow path leading from said vessel to said cavity for activation of said battery.

6. A multi-cell, sealed, zinc-oxygen battery according to claim 1, wherein said pressurized oxygen supply means includes a cylinder of liquid or pressurized oxygen and supply valve.

7. A multi-cell, sealed, zinc-oxygen battery according to claim 1, wherein the exposed portions of said oxygen electrodes are supported and reinforced by ribbing consituted at least by a plurality of slender rails, which rails define ducts for guiding a flow of oxygen across said portions of said oxygen electrodes.

8. A multi-cell, sealed, zinc-oxygen battery according to claim 1, wherein said anode comprises a skeletal frame including conductive metal and having a portion of its surface area formed as open spaces, further comprising a rigid static bed of zinc particles compacted under pressure to said skeletal frame.

9. A multi-cell, sealed, zinc-oxygen battery according to claim 1, wherein said housing is in the form of a segment of an annular structure.

10. A multi-cell, sealed, zinc-oxygen battery according to claim 9, wherein said container is in the form of a cylindrical body having an annular internal space defined by outer and inner cylindrical walls and sealed at both ends.

11. A multi-cell, sealed, zinc-oxygen battery according to claim 10, wherein said inner cylindrical wall surrounds a bore having at least one inlet and at least one outlet for the passage of cooling fluid therethrough.

* * * * *

UNITED STATES PATENT AND TRADEMARK OFFICE
CERTIFICATE OF CORRECTION

PATENT NO. : 5,445,901
DATED : August 29, 1995
INVENTOR(S) : Korall et al.

It is certified that error appears in the above-identified patent and that said Letters Patent is hereby corrected as shown below:

On the Title page, amend the Notice by deleting "Nov. 22,2011" and substitute --March 15, 2014-- therefore.

Signed and Sealed this

Sixteenth Day of July, 1996

Attest:

BRUCE LEHMAN

*Attesting Officer*  *Commissioner of Patents and Trademarks*